Figure 1:
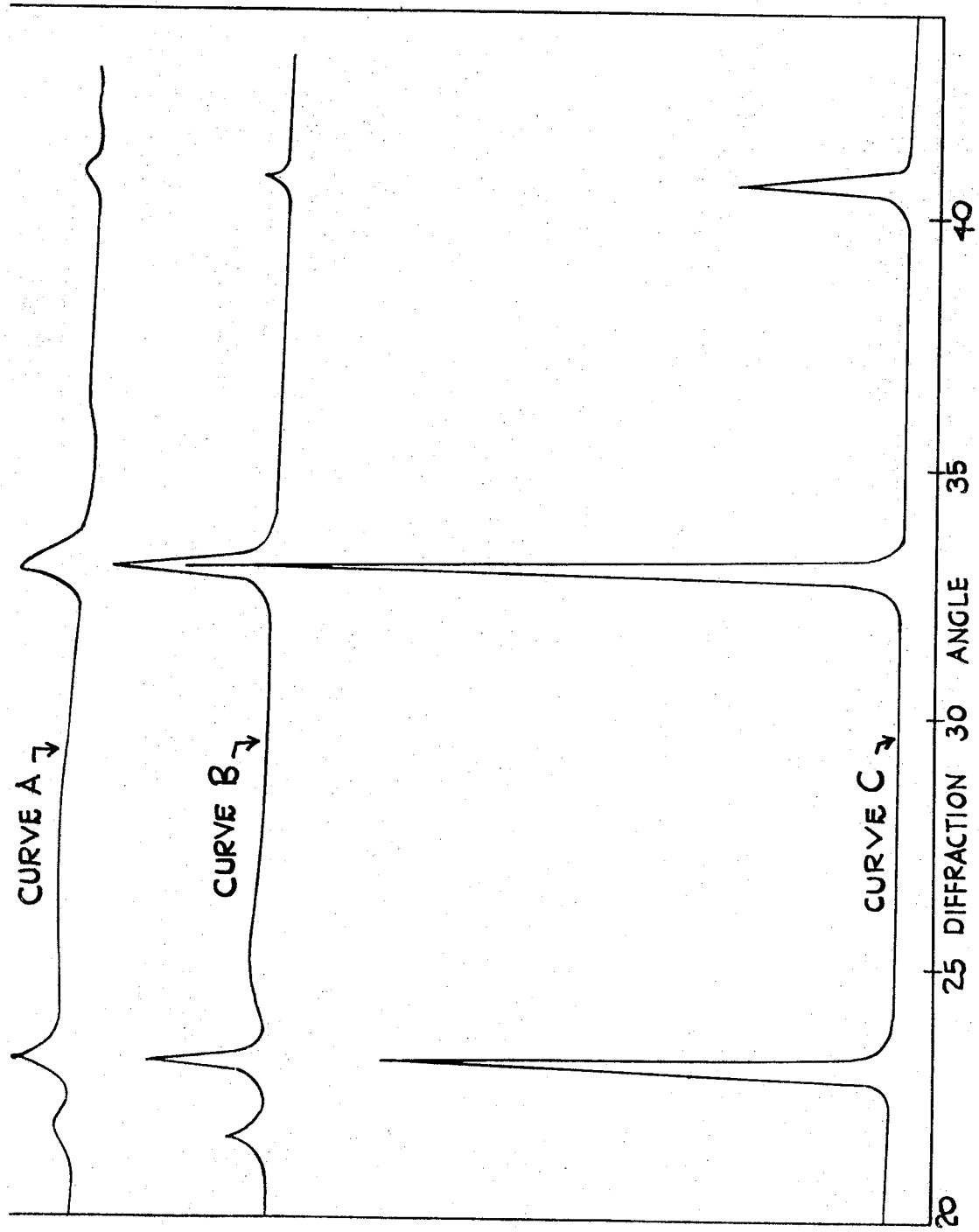

United States Patent

[11] 3,615,761

| [72] | Inventors | Sumio Sakka<br>Troy;<br>John D. MacKenzie, Schenectady, both of N.Y. |
|---|---|---|
| [21] | Appl. No. | 701,974 |
| [22] | Filed | Jan. 31, 1968 |
| [45] | Patented | Oct. 26, 1971 |
| [73] | Assignee | PPG Industries, Inc.<br>Pittsburgh, Pa. |

[54] PHOTOTROPIC ARTICLES CONTAINING THALLOUS HALIDE
2 Claims, 4 Drawing Figs.

[52] U.S. Cl. ................................................ 106/47 R,
106/39 DV, 106/52, 106/54
[51] Int. Cl. .................................................... C03c 3/16,
C03c 3/26, C03c 3/22
[50] Field of Search ........................................... 106/52, 39
DV, 39 C, DIG. 6; 252/301.4, 501, 300

[56] References Cited
UNITED STATES PATENTS

| 1,309,181 | 7/1919 | Case ............................. | 252/501 |
| 1,342,842 | 6/1920 | Case ............................. | 252/501 |
| 3,197,296 | 7/1965 | Eppler et al. ................ | 106/39 |
| 3,208,860 | 9/1965 | Armistead et al. ............ | 106/39 |
| 3,325,299 | 6/1967 | Araujo et al. ................. | 106/52 |
| 3,328,182 | 6/1967 | Araujo et al. ................. | 106/39 |

FOREIGN PATENTS

| 950,906 | 2/1964 | Great Britain ................ | 106/39 |

OTHER REFERENCES

Johnson " Synthetic Optical Crystals," The Glass Industry June 1966 pp. 328– 329 and 338.

Sessions et al., " Report of Investigation of Health Hazards in Connection with Industrial Handling of Thallium," Chem. Abstracts item 4871g - 1947.

Kozyrev et al., Phys. Status Solidi 18 (1) pp. K 57– 61 (1966) " Photoelectric Properties of KRS–5 Single Crystals."

Mellor, Treatise on Inorganic and Theoretical Chemistry, Vol. V pgs. 437,438,451,458 (1924).

Nippon Sheet Glass Co., Ltd. Derwent Publication, August 16, 1967 Belgian Patent Report. No. 29/67; Belgian Patent No. 692,626.

Chemical Abstracts, Vol. 40. (1946) item 2717) " Separation of Heavy Metal Halides in Glasses by Dietzeh.

*Primary Examiner*—Helen M. McCarthy
*Attorney*—Chisholm and Spencer

ABSTRACT: This invention relates to phototropic articles containing thallous halides. It particularly relates to thallous halide containing glasses and glass-ceramics, particularly glasses and glass-ceramics containing thallous halides which have been doped with a metal such as copper or indium.

INVENTORS
SUMIO SAKKA
JOHN D. MACKENZIE

PHOTOTROPIC ARTICLES CONTAINING THALLOUS HALIDE

INVENTION

It has now been discovered that glasses and glass-ceramics containing thallous halide crystals are phototropic; i.e., darken in color when exposed to actinic radiation and then return to their original color when the actinic radiation is removed. The phototropicity of such glass or glass-ceramic articles is enhanced when a metal such as copper or indium is present.

Of the thallous halides useful in this invention, thallous chloride has been found to contribute the greatest phototropic effect in glasses and crystallized glasses (glass-ceramics). Thallous bromide is also of particular utility inasmuch as it promotes greater sensitivity to the longer wave lengths of the visible spectrum. Certain advantages can accrue, therefore, from a combination of thallous chloride and thallous bromide.

The quantity of thallous halide present in phototropic articles of this invention may vary greatly from the least amount which contributes a phototropic effect up to a thallium content of about 25% by weight of the host material. Generally, thallium is present from about 1% by weight to about 20% by weight, and, preferably, from about 2% by weight to about 15% by weight. Since thallous halides are expensive and toxic, it is generally preferred to use the least amount which provides the desired phototropic effect.

It has been found advantageous to introduce a metal such as copper or indium into the glass or glass-ceramic article to enhance the phototropic effect of the thallous halides. Copper or indium may be present in the metallic state or as an ion. The anion portion of the copper or indium compound used in the batch materials is not critical, although the anion utilized should not have a known detrimental chemical effect upon the glass or glass-ceramic or upon the thallous halide. The anion should not be, for example, a strong reducing or oxidizing agent. Useful anions include the halides, carbonates, sulfates, nitrates, oxides, and the like. Anions other than halides will generally by oxidized during the glass-making process. The halides of copper and indium are preferred inasmuch as the halide anion has advantageous effects in the melting and refining of glass and glass-ceramic batches.

Oxides and halides of copper and indium are generally preferred as the sensitizing component in the glasses and glass-ceramics of this invention.

The amount of indium or copper incorporated the glass or glass-ceramic to enhance phototropicity of thallous halides is more fully discussed in copending application Ser. No. 701,973, now abandoned. Generally, these sensitizers are present as about 0.0001% by weight to about 5% by weight of the thallium present, although the preferred range is from about 0.01% by weight to about 1.0% by weight. Greater quantities of copper or indium may be utilized, but no significant increase in sensitization results from use of an excess. Also, the copper and indium are more effective as dopants when simultaneously melted with a thallous halide, as described in copending application Ser. No. 701,973, than when included merely as one of the glass batch materials.

The glass or glass-ceramic utilized as a host for the thallous halide crystals may be any of a variety of materials; for example, borate, silicate, borosilicate, aluminosilicate, or phosphate glasses may be utilized for the purpose of this invention. The nature of the host material is not particularly important although the lower-melting glasses, for example, phosphate glasses, are more readily adaptable for the preparation of thallous halide phototropic articles. Glasses having a low melting point diminish the volatilization loss of the thallous halide. Silicate, borosilicate, or borate glasses could be readily used as a host material through the addition of excess thallous halide in the batch. Also, the higher melting glasses could be melted under pressures greater than atmospheric pressure so as to retard the volatilization loss of thallous halide.

In preparing a phototropic article of this invention, a thallium compound such as thallous chloride, thallous oxide, or thallous carbonate, is incorporated into a glass. A source of halide, e.g., chlorine, is also incorporated into the glass. A useful halide source is provided by alkali metal halides and alkaline earth halides such as sodium chloride, potassium chloride, barium chloride, sodium fluoride, sodium iodide, potassium bromide, and the like. The invention is not restricted to the use of alkali metals or alkaline earth compounds as halide sources inasmuch as halides of any of the cations commonly found in glasses may be utilized.

The preparation of phototropic thallium halide containing glass-ceramic articles differs from the preparation of glass articles only in the heat treatment of the article. In order to crystallize components other than thallium halide, the procedure involves either slow cooling of melted material, prolonged heating of melted materials, or heating the melted materials at temperatures higher than necessary merely for melting purposes.

In melting, forming, and heat treating operations, strongly reducing or strongly oxidizing conditions should be avoided to prevent reduction of the thallous halides to thallium or oxidation of the thallous ion to the nonphototropic thallic ion. Otherwise, conventional melting and forming processes may be utilized. A heat treatment is preferred for promoting formation of very small crystals which are desirable in transparent products.

The following examples illustrate the preparation of phototropic glass and glass-ceramic articles containing thallous chloride crystals. In the following examples, the following phosphate composition was utilized:

| potassium phosphate | 25 | grams |
| barium phosphate | 25 | grams |
| aluminum phosphate | 50 | grams |
| sodium chloride | 6 | grams |
| thallium chloride | 12 | grams |
| copper oxide | 0.015 | grams |

EXAMPLE I

The above glass-making materials were melted at about 1000 TO 1100° C. for about 10 to 20 minutes. Upon cooling to room temperature, a transparent glass was obtained. Samples of this glass were treated at about 410° to 450° C. for 3 to 20 hours. The products obtained were either transparent, translucent, or opaque. The glass samples obtained were examined by powder X-ray techniques. In all glass samples the presence of thallous chloride crystals was detected. This is illustrated in FIG. 1.

FIG. 1 depicts X-ray powder diffraction patterns of a substantially transparent phototropic glass (Curve A), an opaque phototropic glass (Curve B), and thallous chloride powder (Curve C).

When the above glass samples were exposed to ultraviolet light of a wave length of 3660 angstroms or a wave length 2537 angstroms, or were exposed to the sunlight, the glass darkened in color.

Glasses of this invention color to a gray-black, bluish-black, or brownish-black, depending upon the base glass composition, the kind of thallium halide present, the presence or absence of sensitizers such as copper or indium, and the type of heat treatment.

The darkened glasses of this example were bleached in color when they were exposed to longer wavelength light, for example, tungsten lamp light with a blue filter.

When thallous bromide is substituted for thallous chloride in the above experiment, similar results are achieved. The bromine containing glasses were found to be more sensitive to the longer wave length region of the visible spectrum, darkening when exposed to a tungsten light. The chlorine containing glasses were not darkened by exposure to a tungsten light.

EXAMPLE II

A glass-ceramic phototropic article was formed from the above batch materials by first melting and cooling to obtain a transparent glass. After heating at 450° C. for several hours, this glass, almost transparent, showed phototropic qualities. However, the glass became completely opaque when heated at higher temperatures, for instance, at 475° C. The resulting white glass-ceramic was phototropic, that is, darkened upon exposure to ultraviolet light, and returned to its original color state upon exposure to visible light containing substantially no ultraviolet light.

Optical absorption of a rectangular glass plate of 8 millimeters by 20 millimeters in size which had been ground to a thickness of about 0.7 millimeter with polished surfaces was determined. The absorption measurements were done with Bausch & Lomb recording spectrophotometer Model Spectronic 505. The absorption measurements were conducted at room temperature and the samples were maintained in darkness except when subjected to intentional irradiation by light.

Figure 2:
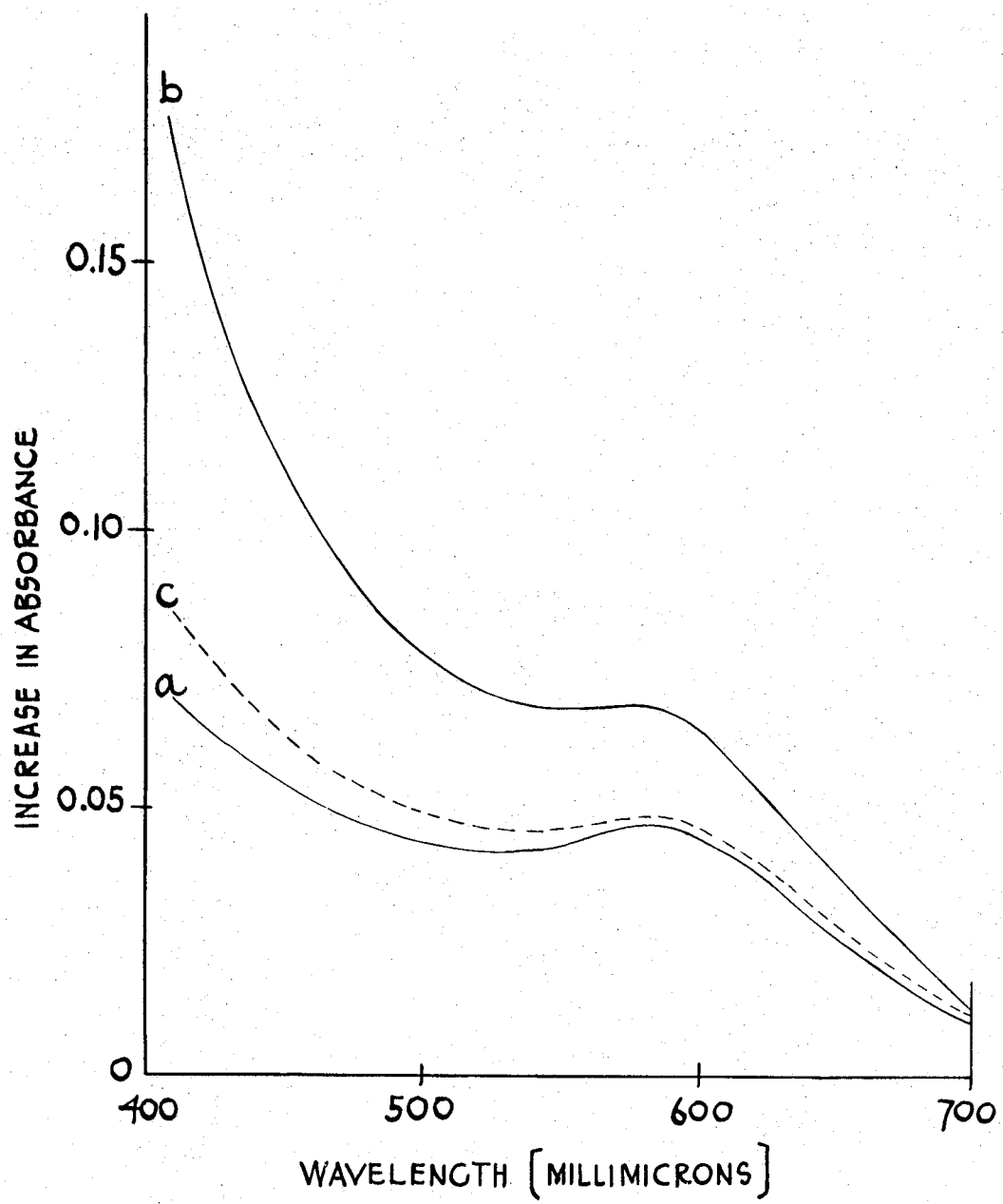

FIG. 2 illustrates the absorption curves of a glass prepared similarly to that of example I, above, wherein the glass was darkened by ultraviolet light. The curves were given in terms of increase of absorbance over that of the original nonirradiated glass. A black-ray lamp emitting light of 3660 angstroms wavelength was utilized as a light source. The sample to be irradiated was placed at 4 centimeters from the center of the lamp and the radiation was conducted at room temperature.

Curve A represents a glass which has been subjected to 3 minutes' exposure to ultraviolet light. Curve B illustrates glass which has been exposed for 16 minutes to ultraviolet light. Curve C represents a glass which has been exposed for 16 minutes to ultraviolet light and followed by 10 minutes of exposure to visible light of 600 millimicrons wavelength. The units of absorbance of the ordinate are arbitrary.

The curves of FIG. 2 illustrate that absorption is increased by irradiation in the whole visible region. However, the absorption seems to consist of two parts, one being an absorption band having a peak of about 500 millimicrons and the other being, presumably, a part of absorption band extending from about 500 millimicrons to the ultraviolet region.

Apart from the absorption measurement illustrated in FIG. 2, it is found that darkening of phototropic glasses and glass-ceramics of the type prepared in examples I and II occurred preferentially at the surface facing the ultraviolet source. It is also found that exposure to bright sunlight caused darkening in the glass or glass-ceramic, although sunlight exposure appeared less effective than exposure to an artificial ultraviolet light source.

Figure 3:
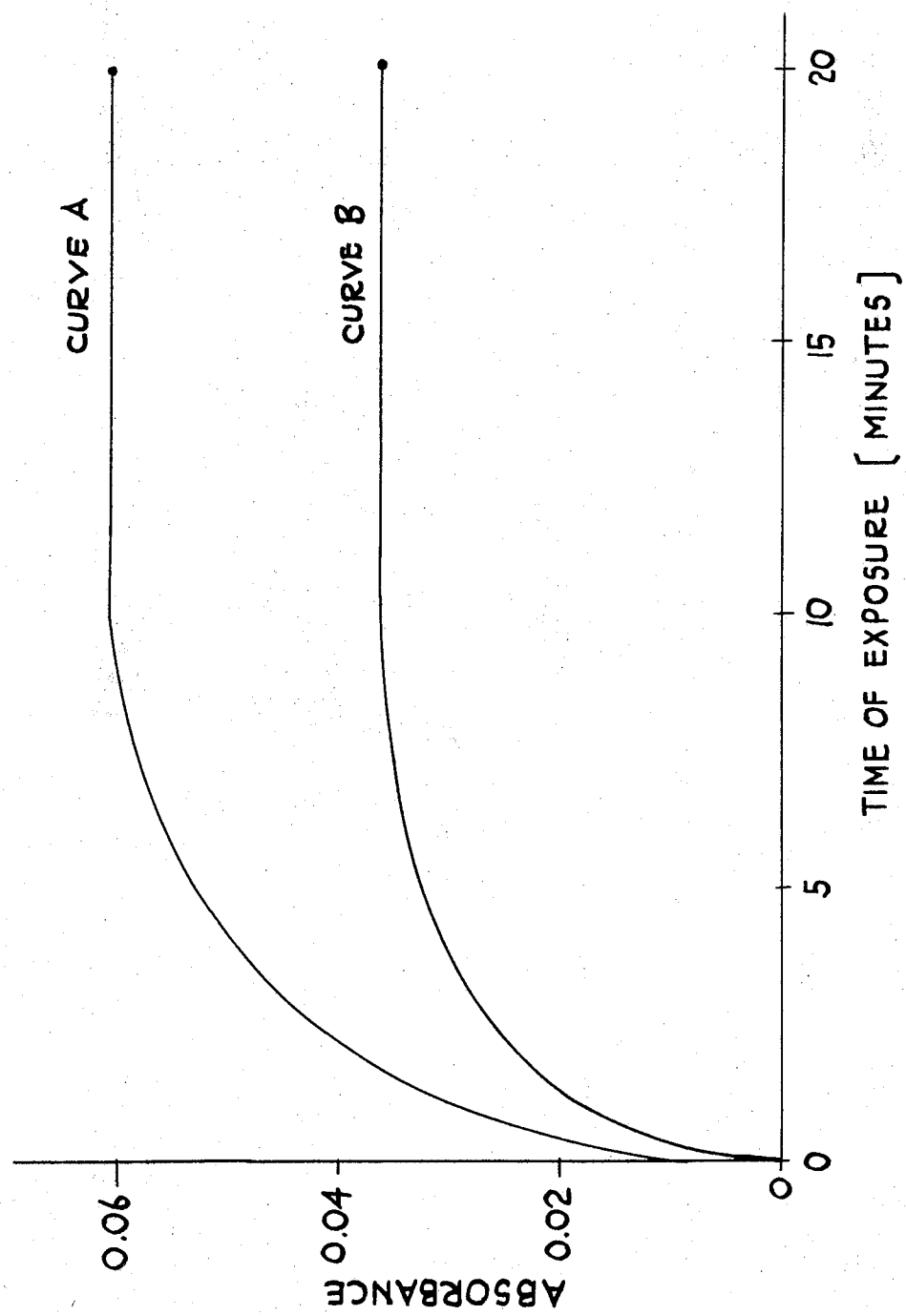

FIG. 3 illustrates the difference in the degree of darkening relative to exposure time for two different intensities of ultraviolet light. The glass sample was one similar to that of example I and was placed at two different distances; 4 centimeters for Curve A and 9 centimeters for Curve B, from the UV light source. The absorption at 600 millimicrons was taken as a measure darkening. In the figure it can be seen that both darkening curves were almost saturated in 10 minutes, but the level of darkening reached is different for two intensities of light. The absorbance ordinate contains arbitrary units indicating increasing absorbance with increasing magnitude of the numbers.

Figure 4:
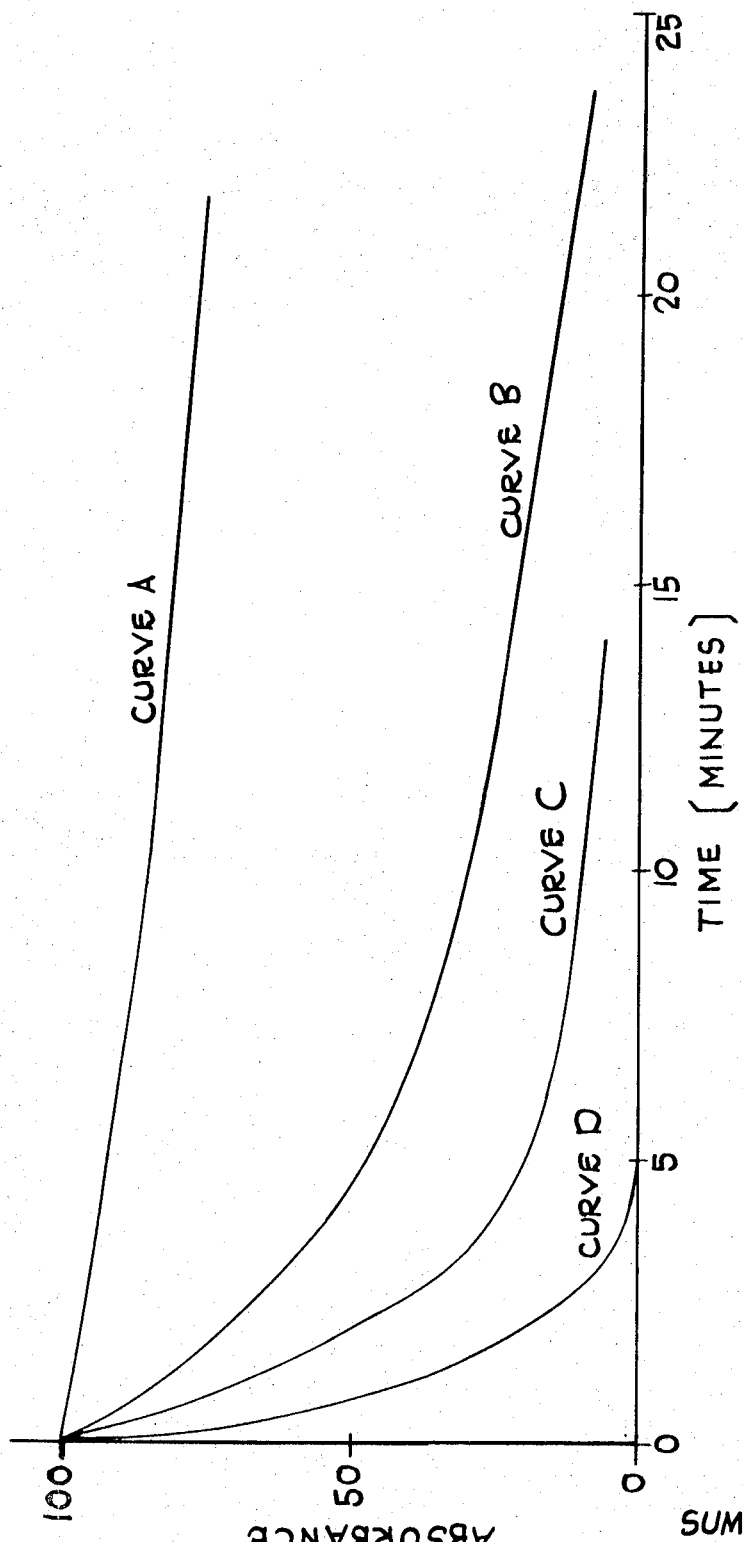

It was further discovered that glasses and glass-ceramics of this invention which had been darkened by ultraviolet light bleached spontaneously when kept in darkness. The bleaching rate was found to be dependent upon temperature, being higher with increasing temperature. FIG. 4 illustrates the bleaching of the glass similar to that of example I at four different temperatures ranging from room temperature (26° C.) to 66° C. In FIG. 4, the absorbance of the glass sample immediately after ultraviolet radiation, that is, before any bleaching has occurred, is represented as 100. The measurement of the absorption was accomplished at a wave length of 600 millimicrons and is recorded in arbitrary units.

Curve A represents glass at 26° C., Curve B is for 40° C., Curve C for 55° C., and Curve D represents a glass at 66° C.

From FIG. 4 it can be seen that at 40° C., about 50 percent of the absorption of the darkened glass was lost in 5 minutes and at 66° C. all the absorption is lost in 5 minutes. It is further discovered that if the bleached sample was darkened again by UV irradiation and then bleached that repeated darkening and bleaching did not cause a fatigue effect.

EXAMPLE III

Glasses were prepared from batch compositions of the following type:

TABLE I

Compositions of Phototropic Glass (Parts by Weight)

| | (1) | (2) | (3) | (4) | (5) |
|---|---|---|---|---|---|
| $KPO_3$ | 25 | 25 | 25 | 25 | 25 |
| $Ba(PO_3)_2$ | 25 | 25 | 25 | 25 | 25 |
| $Al(PO_3)_3$ | 50 | 50 | 50 | 50 | 50 |
| TlF | 6 | 6 | | | |
| TlCl | 6 | | 12 | 12 | 12 |
| NaF | 6 | 6 | | | |
| NaCl | 6 | | 6 | | |
| TlBr | | 6 | | | |
| NaBr | | 6 | | | |
| KCl | | | | 7.6 | |
| $BaCl_2$ | | | | | 10.8 |
| $Cu_2O$ | 0.021 | 0.015 | | 0.015 | 0.015 |

The ranges of the proportions of the components of the above host phosphate glasses, calculated on the basis of the amounts thereof disclosed in table I are 54 to 57% by weight $P_2O_5$, about 8% by weight $K_2O$, 10 to 11% by weight BaO, and 7 to 8% by weight $Al_2O_3$.

The above phosphate glasses were melted and cooled in a manner similar to that described in example I. It was found that transparent, phototropic glasses could be obtained by rapid cooling of the glass melt. Generally, some heat treatment in the range of 410° to 450° C., for a period of about 3 to 20 hours was necessary to induce a phototropic effect.

When glasses of the above compositions were cooled slowly, an opaque glass was obtained which could be converted to a phototropic article by heat treatment. In the above glasses, copper oxide was utilized to enhance the phototropic effect of the article. However, similar results were obtained when indium was introduced as a phototropic sensitizing material. Also, the thallous halide containing glasses, especially thallous chloride containing glasses, were phototropic without the addition of any sensitizing ingredient; however, darkening and fading of the resulting phototropic article was significantly enhanced by the presence of a sensitizer of copper and/or indium.

EXAMPLE IV

Phototropic glasses of the following glass-making materials were prepared:

TABLE II

Compositions of Phototropic Glass (Parts by Weight)

| | 9) (6) 6(7) | | (8) 7) | (80 | (9) |
|---|---|---|---|---|---|
| $Na_2O$ | | 11 | 10 | | |
| $Al_2O_{10}$ | | | 5 | 5 | |
| $B_2O_3$ | | | 20 | 31 | 50 |

|        |      |      |    |    |
| ------ | ---- | ---- | -- | -- |
| $SiO_2$ | 67   | 60   | 31 |    |
| BaO    |      |      | 29 | 30 |
| TlCl   | 12   | 12   | 12 | 12 |
| NaCl   | 12   | 12   | 6  | 6  |
| NaF    | 6    | 6    |    |    |
| $Cu_2O$ | 0.03 | 0.03 |    |    |
| $ZrO_2$ |      |      | 3  | 5  |

The above batch materials resulted in a phototropic material after being melted, cooled, and heat treated. The melting, cooling, and heat treating were conducted in a manner similar to that described in example I. The phototropic properties of these glasses, however, were less noticeable than the phosphate glasses.

Similar results are achieved in the above glass compositions when indium is substituted for copper.

The glass compositions set forth hereinabove are not intended as an exclusive listing of useful compositions. Any of the usual silicate, borate, or phosphate glass compositions are useful in this invention. Glasses having low melting temperatures, however, are preferred, as, for example, phosphate glasses.

Generally, glasses of the silica, boric oxide, or phosphorus oxide type will contain in excess of 30% by weight of silica, boric oxide, or $P_2O_5$. Of course, other glass-forming and glass-making ingredients commonly utilized in glasses may be included in the glasses of this invention. Ultraviolet light absorbing oxides such as iron oxide, Titania and like compounds should be excluded, or, if necessary for some purpose, included only in small quantities.

The novel glass and glass-ceramic articles of this invention are useful as transparent viewing closures, as opaque curtain walls for buildings, or as screens which may be scribed up by use of actinic light.

Although specific embodiments of the invention have been set forth in the above examples, the invention is not limited thereto, but is intended to include all the variations and modifications falling within the scope of the appended claims.

We claim:

1. A phototropic article consisting essentially of a host material of a phosphate glass or crystallized phosphate glass wherein $P_2O_5$ is present in excess of 30% by weight, said host material containing thallous halide crystals having a thallium content from about 1 to 20% by weight based on the weight of the host material, and wherein the thallous halide is sensitized by the presence of a metal sensitizer selected from the class consisting of copper and indium, the sensitizer being present as about 0.001% to about 5.0% by weight of the thallium.

2. The article of claim 1 wherein the host phosphate glass or crystallized phosphate glass consists essentially of 54 to 57% by weight $P_2O_5$, about 8% by weight $K_2O$, 10 to 11% by weight BaO, and 7 to 8% by weight $Al_2O_3$.

* * * * *